United States Patent Office 3,145,104
Patented Aug. 18, 1964

3,145,104
PHOTOGRAPHIC PROCESSES COMPRISING
CROSS-LINKING OF THIOL POLYMERS
Gisela K. Oster and Gerald Oster, both of
36 Grove St., New York, N.Y.
No Drawing. Filed Aug. 7, 1959, Ser. No. 832,168
11 Claims. (Cl. 96—33)

This invention relates to the cross linking of thiol polymers. The invention more particularly relates to the cross linking of thiol polymers using visible light as the initiator for the cross-linking reaction.

Thiol polymers, as the term is used herein, are understood to be polymeric materials containing sulfhydryl groups. Synthetic polymers falling within this classification includes poly-p-thiol styrene. Natural polymers with a synthetically added sulfhydryl group are, for example, the so-called thiolated gelatins. Natural polymers falling within this terminology include wool, hair, and the like in which sulfhydryl groups have been synthetically produced.

One object of this invention is to effect a cross linking of such thiol polymers. This and still further objects will become apparent from the following description:

In accordance with the invention, we have surprisingly discovered thiol polymers may be cross linked when irradiated with visible light if certain dyes are used as sensitizers.

The dyes which may be used as sensitizers for this photo-cross-linking in accordance with the invention are photo-reducible dyes which are incapable of being reduced by the thiol polymer in question in the absence of light but capable of being reduced by the sulfhydryl group of the polymer when photo-excited with visible light.

Apparently when such a system containing the thiol polymer and photo-reducible dye is irradiated with visible light, the light excited dye effects an oxidation of the groups so that pairs of these groups on neighboring polymer molecules combine forming a cross-linking disulfide bond.

The effect of the cross-linking of the polymer is conventional and thus high polymers which are normally soluble and/or thermoplastic may be rendered less soluble or non-soluble and/or thermo-setting. Polymers which are liquid may be rendered more viscous or even solid and the like. In all cases the apparent molecular size of the polymer is increased by the cross-linking bond so that in effect any given polymer is converted to a higher polymer.

The starting thiol polymers used in accordance with the invention may be any polymeric material of natural, synthetic, or partially natural and partially synthetic origin having sulfhydryl groups, preferably present as side groups. Each polymer molecule should preferably have at least one sulhydryl side group and should preferably have at least two sulfhydryl side groups. The starting polymer may be present as a liquid, a solution, a gel, or a solid. The polymer should preferably contain at least 10% water and may contain up to about 95% water.

The molecular weight of the polymer is not critical, but for most purposes it is preferable that the same have a molecular weight of at least 10,000 and preferably between 10,000 and 100,000, as determined by conventional viscosity measurements.

The photo-reducible dyes which may be used in accordance with the invention comprise any known dyes which are capable of forming a stable system with the thiol polymer in the absence of light but which will sensitize the oxidation of the sulfhydryl groups of the polymer when irradiated with visible light. These dyes include rose bengal, phloxine, erythrosine, eosin, fluorescein, acriflavine, thionine, riboflavin. chlorophyls, hematoporphyrin, proflavine, methylene blue, and the like. The dyes thus include members of the fluorescein family, the thiazine family, and certain acridines and porphyrins. A large number of these dyes are characterized by their fluorescence and are for example described in United States Patent 2,850,455 and U.S. Patent 2,875,047.

The dye and the polymer are preferably combined in a system containing an aqueous medium, as for example an aqueous solution containing the dye and the polymer or where the polymer is in substantially solid form, containing the aqueous media and the dye occluded, as for example as the discontinuous phase in a gel.

Thus, for example, where the polymer is a gel, the dye is added to the solution from which the gel is formed.

The amount of dye is not critical but should be sufficient to convert at least a portion of the sulfhydryl groups to disulfide groups when the dye is irradiated with visible light.

In principle, each molecule of photo-excited dye will reduce at least one sulfhydryl group and may be regenerated for further reduction. A stoichiometric amount of dye is desirable to convert all the sulfhydryl groups. There, however, is no harm in having a smaller amount of dye though an excess is preferable in practical operation. With an excess of the dye, there is an assurance that all of the sulhydryl groups will be converted to cross-linking bonds.

Quite surprisingly the cross-linking effect is completely localized and only the light struck area of the polymer will be cross-linked with the cross-linking occurring in proportion to the light intensity. The photo cross-linking of the polymer systems in accordance with the invention is thus excellently suited for photo-reproduction.

The system may thus be used for photo-reproduction in a manner similar to the bichromate process except that in place of the bichromate gel the thiol polymer containing the photo-reducible dye is used, and in place of ultra-violet light visible light is used.

For example, a thiolated gelatin containing a photo-reducible dye, in accordance wtih the invention, may be cast in the form of a flat surface or film over a backing plate such as an etchable plate. The same may then be irradiated with a visible light image which will cross-link the light struck areas rendering the same insoluble. The remaining portion of the gel may then be washed away leaving the cross-linked portions corresponding to the light-struck areas forming the image. The plate then may be used as such for printing or may be etched, the remaining cross-linked portions of the polymer protecting the backing from the etching alkali or acid.

The polymer containing the dye is, of course, photo-sensitive so that the same must be shielded from light of sufficient intensity to photo-excite the dye, as for example, kept in the dark in the manner of an ordinary photographic emulsion until the desired exposure is effected.

The polymer may then be exposed to the visible-light image in order to effect the photo-reproduction. The light source may be any light source producing light within the visible range, i.e., having a wave length between about 400 and 760 millimicrons. Actually, it is only necessary to irradiate with a wave length which the particular dye absorbs. Since by very definition the dye is a colored substance, this wave length will always be in the visible light range. As a light source any of the conventional sources of visible illumination may be used, as for example conventional projectors, enlargers, contact printing apparatus or the like. The sensitivity of the material may generally be controlled by a suitable choice of the type and quantity of dye, and the system may be made extremely light sensitive so that only a brief flash with relative low-intensity light will suffice for the cross-linking.

In order to produce or reproduce an image, the visible light must be in the form of a visible light image, i.e., have variations in intensity corresponding to the image to be reproduced. This may be effected in any known or desired manner for forming a light image, as for example by irradiating with visible light through a photographic positive or negative transparency, by projecting a transparency, or reflected image or by passing light through a translucent printed or typewritten sheet or by directly producing an image with a lens or the like.

After the irradiation, the portions of the polymer which are not cross linked may be washed away with a suitable solvent for the uncross-linked portions, as for example, water leaving the insoluble cross-linked polymer at the areas which have been light struck, in the same manner as a conventional bichromate process. After irradiation, the plate or backing containing the irradiated polymer, in accordance with the invention, may be further treated in the conventional manner, making sure, however, that the portions of the polymer which are still soluble are removed, as for example by washing out before further exposing the material to visible light. Polymers so formed may be directly used for lithography or the plate may be etched or the like.

In the case of photographic reproduction and similar use where a broad color-sensitivity is necessary, at least three photo-reducible dyes should be incorporated in the polymer, each having an absorption maximum for a different one of the primary colors. Thus, for example, acriflavine, rose bengal and methylene blue may be used as the dyes.

The process and material, in accordance with the invention are excellently suited for color reproduction and in order to control the color-sensitivity of the plate, it is merely necessary to choose a suitable dye or dye combination.

As the cross-linking may, in effect, be considered a further polymerization, the process and material, in accordance with the invention, may be used in the identical manner and for the identical purposes as described in connection with United States Patent 2,875,047. In this connection, the uncross-linked polymer, in accordance with the invention, corresponds to the monomer of said patent whereas the cross-linked polymer would correspond to the polymer formed from the monomer. Thus, for example, the process and material, in accordance with the invention, may be used for photo-sensitive emulsions, three-plate color photography systems, radiographic photography, printing matrices, etched plates, color-printing plates, lithographic plates, stencils, silk screens, master forms for spirit reproductions, raised transfer stamps, and the like in the identical manner as described in the said patent. Further, the process and material may be used for making printed circuits, as for example described in co-pending application, Serial No. 792,727, filed February 12, 1959.

As many natural polymers are thiol polymers, the process, in accordance with the invention, may be used for varying the characteristics thereof. For example, wool, hair, or the like may be converted with thioglycolic acid to render the same gelatinous and pliable and produce the free mercapto groups. After impregnation with a photo-reducible dye, in accordance with the invention, the same may be cross-linked upon exposure to visible light, thus permanently imparting or setting the shape which the material had assumed when irradiated. This, for example, may be used for permanent waving human hair with the so-called setting or neutralization step being merely effected by irradiation with visible light. Similarly, wool or other animal fibers may be set in this manner. As the setting is completely localized to the light struck area, it is possible, in accordance with the invention to selectively set given areas of the material and thus produce odd and decorative effects. The following examples are given by way of illustration and not limitation:

*Example 1*

An aqueous solution is formed containing 0.01% by weight of eosin and 10% by weight of a thiolated gelatin containing 20 moles of sulfhydryl groups per 100,000 grams and commercially sold under the trade name "Thiogel 20."

A solution is made up by dissolving the thiolated gelatin in water and adding eosin to the solution. The solution is then allowed to set on a glass plate in the dark. The surface of the plate containing the gelatin is then exposed to a photographic image through a photographic negative using a 500 watt tungsten lamp at a distance of 15 inches for 2 minutes. After the exposure, the plate is washed with warm water. A photographic positive of the photographic negative is formed on the plates with cross-linked gelatin remaining at the light struck areas.

*Example 2*

Example 1 is repeated using in place of the eosin the following dyes: rose bengal, phloxine, erythrosine, fluorescein, acriflavine, riboflavin, proflavine, hematoporphyrin, and chlorophyll. In each case comparable results are obtained.

*Example 3*

Example 1 is repeated except that the thiolated gelatin is replaced by a 30% by weight viscous alkaline solution of poly-p-thiolstyrene (pH 10). Additionally the solution is maintained substantially free from oxygen under a nitrogen atmosphere and in place of being "set" on the glass plate, the same is merely dried on the plate. Results substantially similar to those in Example 1 are obtained.

*Example 4*

A solution was made up containing about 10% of dissolved Thiogel 20, about 0.01% methylene blue and the balance water. The solution was coated on a polished aluminum sheet and left to dry forming a film about 0.1 mm. thick which was retained in the dark. Two other identical sheets were made up but in the solution used to coat one the methylene blue was replaced with erythrosine, while in the solution used to coat the other, the methylene blue was replaced with proflavine. Each of the sheets was illuminated in turn for 3 minutes with a 500 watt tungsten lamp through a color-negative transparency. After the exposure, the sheets were washed with warm water which removed the still soluble uncross-linked portions of the gelatin. Thereafter the sheets were immersed in a 5% phosphoric acid solution which impaired the ink retentivity of the exposed surface of the aluminum. The plates were then used for off-set color printing, the sheet coated with the solution containing methylene blue being inked with cyan coloring, the sheet coated with the solution containing proflavine being inked with yellow ink, and the sheet coated with a solution containing the erythrosine being inked with magenta ink. The printing was effected on white paper with the usual off-set process, the inked image being transferred from the sheet to a rubber roller, and then on to the paper, with the three-inked images being superimposed one over the other on the paper. A true printed color positive of the color negative transparency resulted.

Example 5

An aqueous solution was made up using 10% of Thiogel 20. A white paper was soaked in the solution and allowed to dry. A 1% solution of methylene blue was used as an ink to print small 0.1 millimeter diameter dots in a given array closely spaced on the treated paper. Similarly, a yellow ink made up of 1% solution of proflavine was used to print similar dots but out of register with the first dots. Similarly, a third ink was made of a 1% solution of erythrosine and was used to print a third array of dots out of register with the first two arrays of dots. The dots were so closely spaced that the paper appeared almost black when viewed. The paper was exposed for 5 minutes to a color negative transparency using a 500 watt tungsten lamp. After washing with warm water, a faithful color-positive print of the original color negative was obtained.

Example 6

The coated sheet of Example 5 was exposed in an ordinary camera for a minute to a sunlight lamp, through an F2 lens. After the exposure, the exposed paper is pressed with a roller against a moist white absorbent sheet, a true color photograph is obtained on the white sheet.

Example 7

An aqueous solution containing 10% of Thiogel 20 was coated on three separate cellophane sheets, one of which had been pre-coated with 0.1% solution of methylene blue containing 1% of cyan coupler (diketohydrineden), the other pre-coated with a 0.1% solution of proflavine with a yellow coupler (1% acetoacetic ester) and the third pre-coated with a 0.1% solution of erythrosine with a magenta coupler (1% methylene-cyanamide).

The three layers were superimposed and exposed to a 35 mm. color-positive transparency using a 300 watt slide projector at a distance of 3 feet for 2 minutes. Thereafter, the thre layer composite was developed with para-phenylene diamine in the form of 5% solution, and there was obtained a color transparency corresponding to the original.

Example 8

A lock of human hair was soaked in thioglycolic acid to render it gelatinous and pliable. The hair was then washed carefully to remove all the residual thioglycolic acid and impregnated with eosin. The hair was then curled with conventional curler and exposed to 100 watt ordinary incandescent tungsten lamp for 2 minutes. The curler was removed and it was found that the hair was permanent waved in the form of a curl.

Example 9

The previous example was repeated using wool in place of human hair, and exposing the same, after being wrapped around a curler with a projected image having alternate black and white light bands. After 10 minutes' exposure the wool was removed from the curler, recurled in the opposite direction and exposed to white light from a 300 watt slide projector for 10 minutes and removed from the curler. It was found that the wool had alternately permanently set curved sections giving a decorative, wavy effect.

While the invention has been described in detail with reference to certain specific embodiments, various changes and modifications which all within the spirit of the invention and scope of the appended claims will become apparent to the skilled artisan. The invention is, therefore, only intended to be limited by the appended claims or their equivalents wherein we have endeavored to claim all inherent novelty.

We claim:

1. A polymer having a molecular weight of at least 10,000 and thiolated with sufficient synthetically produced sulfhydryl groups to cross-link the polymer by the formation of disulfide bonds upon oxidation containing a dissolved organic photo-reducible dye incapable of being reduced by said polymer in the absence of light but capable of being reduced by the sulfhydryl groups of said polymer when photo-excited with visible light, said photo-reducible dye being present in an amount sufficient to, upon being irradiated with visible light, cause oxidation of the sulfhydryl groups of said polymer converting said groups to disulfide groups cross linking the polymer.

2. Material, according to claim 1, in which said organic photo-reducible dye is a member selected from the group consisting of rose bengal, phloxine, erythrosine, eosin, fluorescein, acriflavine, riboflavin, proflavine, Azur C, chlorophylls, and hematoporphyrin.

3. Material, according to claim 1, in which said polymer is a thiolated gelatin.

4. Material, according to claim 1, in which said polymer is in the form of a layer on a flat backing.

5. Process for the cross-linking of polymers which comprises irradiating with visible light a polymer having a molecular weight of at least 10,000 and thiolated with sufficient synthetically produced sulfhydryl groups to cross-link the polymer by the formation of disulfide bonds upon oxidation containing a dissolved organic photo-reducible dye incapable of being reduced by said polymer in the absence of light but capable of being reduced by the sulfhydryl groups of said polymer when photo-excited with visible light, said photo-reducible dye being present in an amount sufficient to, upon being irradiated with visible light, cause oxidation of the sulfhydryl groups of said polymer converting said groups to disulfide groups cross-linking the polymer, said visible light irradiation being of a duration and intensity sufficient to cause oxidation of at least a portion of said sulfhydryl groups cross-linking the polymer.

6. Process, according to claim 5, in which said organic photo-reducible dye is a member selected from the group consisting of rose bengal, phloxine, erythrosine, eosin, fluorescein, acriflavine, riboflavin, proflavine, Azur C, chlorophylls and hematorporphyrin.

7. Process, according to claim 5, in which said polymer is a natural polymer containing synthetically produced free sulfhydryl groups.

8. Process, according to claim 5, in which said polymer is a thiolated gelatin.

9. A photo-reproduction process which comprises irradiating with a visible light image a polymer having a molecular weight of at least 10,000 and thiolated with sufficient synthetically produced sulfhydryl groups to cross-link the polymer by the formation of disulfide bonds upon oxidation containing a dissolved organic photo-reducible dye incapable of being reduced by said polymer in the absence of light, but capable of being reduced by the sulfhydryl groups of said polymer when photo-excited with visible light, said photo-reducible dye being present in an amount sufficient to, upon being irradiated with visible light, cause oxidation of sulfhydryl groups of said polymer, converting said groups to disulfide groups cross-linking the polymer said irradiation being of sufficient duration and intensity to photo-excite at least a portion of said dye, thereby cross-linking said polymer and thereafter washing out the uncross-linked portions.

10. A process, according to claim 9, in which said organic photo-reducible dye is a member selected from the group consisting of rose bengal, phloxine, erythrosine, eosin, fluorescein, acriflavine, riboflavin, proflavine, Azur C, chlorophylls and hematoporphyrin.

11. A process, according to claim 9, in which said polymer is thiolated gelatin.

(References on following page)

References Cited in the file of this patent

UNITED STATES PATENTS

| | | |
|---|---|---|
| 1,013,458 | Smith | Jan. 2, 1912 |
| 1,852,231 | Bryner | Apr. 5, 1932 |
| 2,068,809 | Maeder | Jan. 26, 1937 |
| 2,540,980 | Beste et al. | Feb. 6, 1951 |
| 2,663,644 | Hansen | Dec. 22, 1953 |
| 2,668,777 | Gold | Feb. 9, 1954 |
| 2,850,445 | Oster | Sept. 2, 1958 |
| 2,869,559 | Moore | Jan. 20, 1959 |
| 2,875,047 | Oster | Feb. 24, 1959 |
| 2,899,965 | McGoldrick et al. | Aug. 18, 1959 |

OTHER REFERENCES

Glafkides: Photographic Chemistry, Fountain Press, London, vol. I, first published in English in 1958, p. 281. (Copy in Group 170.)

Millson et al.: American Dyestuff Reporter, vol. 37, No. 13, June 1948, pages 423–429.

Siegrist I: Soap and Chemical Industries, November 1955, pages 44–47, 179 and 181.

Siegrist: Soap and Chemical Industries, December 1955, pages 58–61 and 113.

Alexander et al.: Wool—Its Chemistry & Physics, Reinhold Publishing Co., N.Y., 1954, page 8. (Copy in Div. 43.)

Merck Index, 6th edition, Student Edition, Merck and Co., Rahway, N.J., 1952, pages 386–387. (Copy in Div. 60.)

Shepard: Gelatin in Photography, vol. I, Eastman Kodak Co., Rochester, N.Y., 1923, page 105. (Copy in Div. 60.)

Chemical and Engineering News, Dec. 8, 1952, pages 5152–5153. (Copy in Sci. Lib.)

Nature, vol. 164, Oct. 1, 1949, page 576. (Copy in Sci. Lib.)